April 26, 1966 H. S. BEATTIE ET AL 3,247,941

PRINTING HEAD WITH MEANS TO POSITION
HEAD BEFORE STRIKING MOVEMENT BEGINS

Filed Dec. 20, 1963 3 Sheets-Sheet 1

INVENTORS
HORACE S. BEATTIE
BY JOHN E. HICKERSON
Frank C. Leach Jr.
THEIR ATTORNEY April 26, 1966 H. S. BEATTIE ET AL 3,247,941

PRINTING HEAD WITH MEANS TO POSITION HEAD BEFORE STRIKING MOVEMENT BEGINS

Filed Dec. 20, 1963 3 Sheets-Sheet 3

United States Patent Office 3,247,941

Patented Apr. 26, 1966

3,247,941

PRINTING HEAD WITH MEANS TO POSITION HEAD BEFORE STRIKING MOVEMENT BEGINS

Horace S. Beattie and John E. Hickerson, Lexington, Ky., assignors to International Business Machines Corporation, New York, N.Y., a corporation of New York Filed Dec. 20, 1963, Ser. No. 332,041

17 Claims. (Cl. 197—55)

This invention relates to printing mechanisms and, more particularly, to a single element printing head of the cylindrical type for a typewriter or the like.

Single element printing heads of the cylindrical type have previously been utilized with printing devices that operate with a front strike print action. However, the prior cylindrical type heads have not produced the desired quality of print. This has been because of the use of either a solid, massive member as the type head or a cylindrical printing core with a thin-walled cylindrical type head sliding on the core.

When the solid, massive member is utilized as a type head to produce a heavy blow when printing, the mass of the member is not applied primarily behind the selected character being printed but is distributed throughout the length of the cylindrical type head. Similarly, the mass of the cylindrical printing core is not applied primarily behind the selected character being printed but is spread over the length of the cylindrical type head.

The present invention satisfactorily solves these problems by utilizing a thin-walled shell as the type head sliding over a printing anvil having its mass concentrated at the printing position. Thus, the mass of the printing anvil always is applied to the selected character being printed rather than being distributed over the length of the type head.

The characters on the cylindrical type head of the present invention are positioned generally so as to have the larger area characters along the bottom of the shell with the smaller area characters toward the top. Thus, when the shell is raised to its uppermost position to present a character of large area for printing, the inertial force due to the mass of the shell is greater than the inertial force created by the mass of the shell when the shell is in its lowermost position in which a character of small area is printed.

In any single element printing head, the selected character must be in its exact printing position and remain there during the printing operation to produce a clear printed character. The present invention utilizes a structure for not only holding the selected character in its printing position but also for insuring that the selected character is in its true or exact printing position.

An object of this invention is to provide a single element printing head in which the mass of the type head is utilized to vary the printing force in accordance with the type face areas of the characters.

Another object of this invention is to concentrate the mass of the printing anvil behind the character being printed.

Still another object of this invention is to provide a single element printing head in which a heavier printing force is utilized for larger type face areas than for smaller type face areas.

A further object of this invention is to provide a single element printing head with a mechanism for locking the selected character in its printing position during the printing operation.

The foregoing and other objects, features and advantages of the invention will be apparent from the following more particular description of preferred embodiments of the invention, as illustrated in the accompanying drawings.

Figure 1:
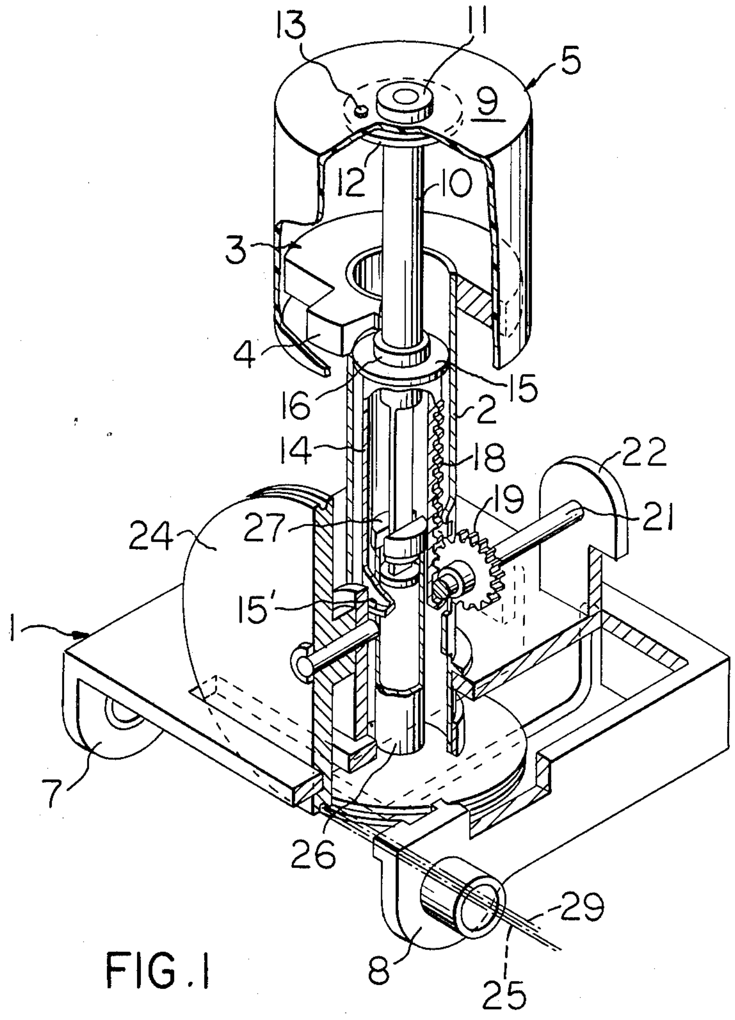
FIG. 1 is a perspective view, partly in section, of the single element printing head of the present invention without any type characters thereon for clarity purposes.
Figure 4:
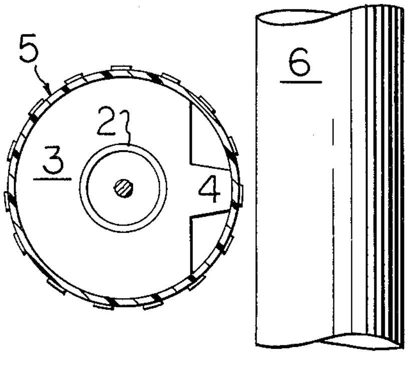
FIG. 4 is a sectional view taken along the line 4—4 of FIG. 2.

Referring to the drawings and particularly FIG. 1, there is shown a base 1 having a hollow post or support 2 extending upwardly therefrom. A substantially disc shaped printing anvil 3 is secured to the uppermost end of the support 2 but is narrowed or relieved in one area to provide a projection (see FIGS. 1 and 4), which forms a printing face 4.

A thin-walled cylindrical shell 5, which functions as a single element printing or type head, surrounds the printing anvil 3 for axial and rotative movement relative thereto. The shell 5 may be made of metal or plastic or formed with a very thin steel shell on its inner side and a molded plastic member on its outer side. The inner steel shell would preferably have lightening holes therein.

The shell 5 has a plurality of type characters arranged on its periphery in parallel horizontal rows and parallel vertical columns. The selected character on the periphery of the shell is moved to a position in front of the printing face 4 of the printing anvil 3 so that it may be moved into contact with a curved platen 6 (see FIG. 3) of a typewriter.

The character on the periphery of the shell 5 in front of the printing face 4 is moved into contact with the platen 6 by pivoting the base 1 about an axis extending through the centers of openings or apertures in depending ears 7 and 8 of the base 1. Any type of mechanism may be utilized for pivoting the base 1 to move the character on the shell 5 into engagement with the platen 6; an example of one type of mechanism is shown in U.S. Patent 2,919,002 to Palmer. Since the pivoting mechanism does not form a part of the present invention, it will not be described in detail herein.

In order to concentrate the mass of the printing anvil 3 behind the character being printed, the printing anvil 3 is substantially the same depth as the characters on the shell 5. The depth of the printing anvil 3 is preferably less than the depth of two rows of vertically spaced characters on the shell 5 but is at least substantially the depth of one row of the characters on the shell 5. Since the width of the printing face 4 is substantially the same as the largest type character, the shell contact area of the printing face 4 is substantially the same as the area of the outline of the largest type character. It should be understood that the term "outline" as used in the specification and claims in referring to the area of the character means the area defined by the maximum width and height of the character and not merely the configuration of the character. If the printing face 4 had a greater depth or width than the characters on the periphery of the shell 5, there would be a tendency for portions of other characters to be printed and the quality of the print would be reduced because the mass of the anvil 3 would not be concentrated behind the character being printed.

An actuating shaft 10 is secured to a top 9 of the shell 5 by suitable means such as a nut 11 or the like. This permits the cylindrical shell 5 to be easily replaced by another type head by merely releasing the nut 11.

The shaft 10 has a disc or annular member 12 with an upwardly extending pilot pin 13 on its upper end. The disc 12 is disposed beneath the top 9 of the shell 5 and in contact therewith. The pilot pin 13 is adapted to fit within an aperture in the top 9 of the shell 5 to properly position any shell on the shaft 10. This results in the characters on any selected shell being properly aligned with the mechanisms actuating the shaft 10 to position the shell 5 whereby the correct letter is printed when the typewriter key is actuated.

The shaft 10 may be moved axially with respect to the support or post 2 through which it extends and may be rotated about its axis. The axial movement of the shaft 10 results in the various horizontal rows of characters being positioned in the same horizontal plane as the printing anvil 3. The rotation of the shaft 10 about its axis causes the various columns of characters on the periphery of the shell 5 to be rotated in front of the printing face 4 of the printing anvil 3. Thus, the shaft 10 functions to move the shell 5 to position the selected character in front of the printing face 4 of the printing anvil 3.

A hollow tube 14 is disposed within the hollow support 2 and surrounds the shaft 10. The hollow tube 14 has its top 15 connected to a two-way thrust bearing 16, which is attached to the shaft 10. The connection between the bearing 16 and the top 15 of the tube 14 permits rotation of the shaft 10 without the hollow tube 14 being rotated. It should be noted that the periphery of the top 15 is larger than the rest of the hollow tube 14 to provide sliding contact along the interior of the support 2. A collar 15' on the lower end of the tube 14 also provides sliding contact with the interior of the support 2.

The tube 14 has a pinion rack 18 thereon for cooperation with a pinion gear 19, which extends through an opening 20 (see FIG. 3) in the support 2. The pinion gear 19 is mounted on a shaft 21, which is supported in upstanding brackets 22 and 23 on the base 1. The shaft 21 is connected to a pulley 24, which may be driven by any suitable mechanism such as that of the aforesaid Palmer patent through a tape 25. Thus, whenever the pulley 24 is rotated by the tape 25, the pinion gear 19 is driven to advance or retract the tube 14 whereby the shell 5 is moved upwardly or downwardly.

A hollow tube 26 is disposed within the tube 14 and is connected to the shaft 10 through a slotted bearing or collar 27. This portion of the shaft 10 is preferably flat on two sides for cooperation with the collar 27. The lower end of the tube 26 extends beneath the base 1 and has a pulley 28 attached thereto. The pulley 28 is pivotally supported on the lower end of the support 2 (see FIGS. 2 and 3). The pulley 28 may be rotated by a tape 29 through suitable mechanism such as that disclosed in the aforesaid Palmer patent. Accordingly, rotation of the pulley 28 causes the shell 5 to rotate through rotation of the shaft 10.

Figure 3:
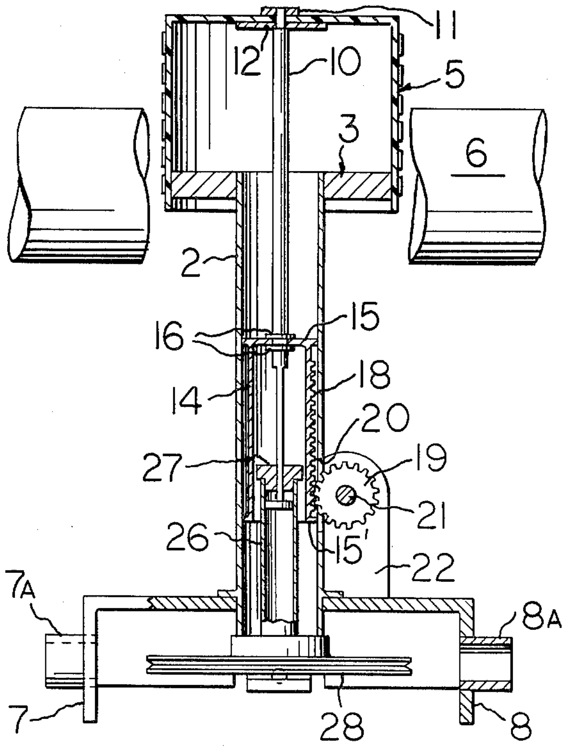
FIG. 3 is a sectional view, partly in elevation, of the structure of FIG. 2 with the printing head in its uppermost position.
Figure 2:
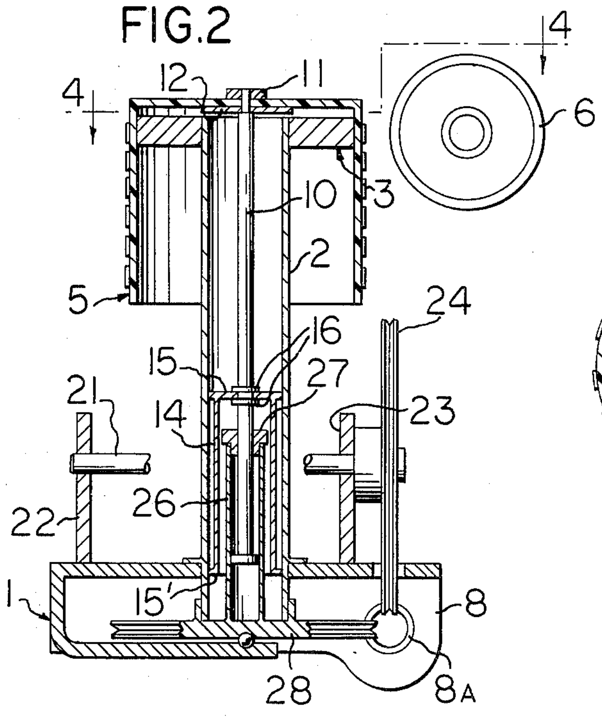
FIG. 2 is a sectional view of the printing head of the present invention and a typewriter platen with which it cooperates with the printing head shown in its lowermost position.

Whenever the shell 5 is advanced axially due to rotation of the pulley 24, the average distance of the shell 5 from the pivot axis of the base 1 is varied. Thus, when the shell 5 is in its lowermost position as shown in FIG. 2, the inertial force, which is created by the shell 5, is much smaller than when the shell 5 is in its uppermost position as shown in FIG. 3. This is because the inertial force is proportional to a product of the mass of the shell 5 and its distance from the pivot axis of the base 1.

While the inertial force created by the mass of the shell 5 is small in comparison with the force created by the large mass of the printing anvil 3 and its supporting structure, there is still a substantial variation in the inertial forces between the position of the shell 5 in its lowermost position and in its uppermost position. Accordingly, the type characters are arranged on the shell 5 to take advantage of this varying inertial force to create a more uniform printing force by generally placing the characters with the largest type areas in the bottom row. It should be noted that the characters in the bottom row are disposed in front of the printing face 4 of the printing anvil 3 when the shell 5 is in its uppermost position.

Figure 5:
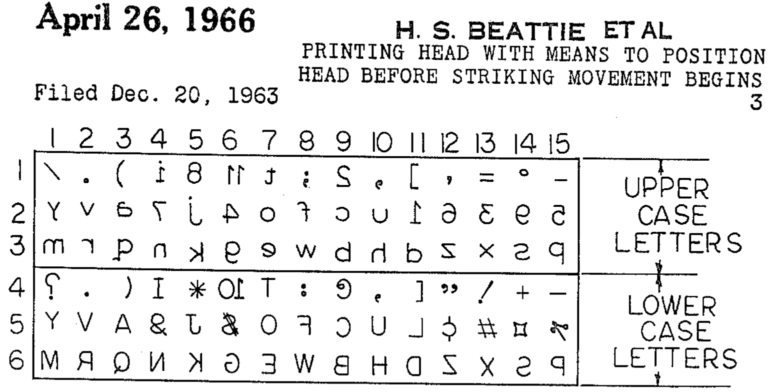
FIG. 5 is a development view of one group of type characters utilized on the periphery of the printing or type head.

One arrangement of the characters on the shell 5 is shown in FIG. 5 with the characters disposed in six horizontal parallel rows and fifteen vertical columns to provide a total of ninety characters. The upper case letters are positioned on the bottom three rows (4–6) while the lower case letters are on the top three rows (1–3). In general, in any of the fifteen vertical columns, the largest type area is found in row 6, which is the bottom row.

Because some characters appear as lower case on the keys of a typewriter and other characters as upper case on the typewriter's keys, there are isolated instances in which the character in a column may have a slightly smaller area than a character above it in the same column. However, this is the exception and the arrangement generally positions the largest type area on the bottom horizontal row of any column with the areas of the type characters decreasing until the top row is reached.

When the characters are arranged as shown in FIG. 5 wherein the upper case letters are on the three bottom rows (4–6) and the lower case letters on the three top rows (1–3), it is necessary that the shift arrangement, which causes the upper case letters to be printed, actuate the pulley 24 to axially advance the shell 5. In the aforesaid Palmer patent, a spherical single printing element is rotated and tilted to produce the selected character whereas the cylindrical shell 5 of the present invention is rotated and advanced axially. Thus, the structure of the aforesaid Palmer patent that tilts the spherical typing head would be employed to axially move the shell 5 of the present invention. However, in the aforesaid Palmer patent, shifting occurs by rotating the sphere 180°. Accordingly, when using the arrangement of characters of FIG. 5, it would be necessary to connect the structure of the aforesaid Palmer patent to actuate the pulley 24 rather than the pulley 28 when the shift key is depressed.

With the shell 5 having the character arrangement of FIG. 5 on its periphery, the pulley 24 advances or retracts the shell 5 a maximum of three rows when any character is selected. With the shell 5 normally positioned with lower case letters cooperating with the printing face 4 of the printing anvil 3, actuation of the pulley 24 results in one of the three top rows (1–3) being selected to present its characters in the horizontal plane of the printing face 4 of the printing anvil 3. The specific character in the selected row is determined by rotation of the shell 5 about its axis through rotation of the pulley 28. Thus, a specific character in one of the columns is advanced to the printing position in front of the printing face 4 of the printing anvil 3. It should be understood that the axial and rotative movements of the shell 5 occur simultaneously.

When it is desired to select one of the upper case letters, the pulley 24 is actuated to advance the shell 5 upwardly to present the bottom three rows (4–6) for cooperation with the printing face 4 of the printing anvil 3. This may be accomplished through use of the shift mechanism of the aforesaid Palmer patent. With the bottom three rows (4–6) available for presentation to the printing face 4 of the printing anvil 3, the pulley 24 is again actuated to move the shell 5 axially to position the desired row of the three bottom rows (4–6) in the horizontal plane of the printing face 4. The specific character in the selected row is determined by rotating the pulley 28 to rotate the shell 5 to present the specific column having the selected character in front of the printing face 4.

It should be understood that the characters on the periphery of the shell 5 must be arranged so that the appropriate key will present the desired character in front of the printing face 4. For example, "*m*" is found in row 3 of column 1 in FIG. 5 whereas "M" is found in row 6 of column 1. Thus, when the key with the letter "*m*" is depressed by the operator, the shell 5 is rotated to present column 1 at the printing face 4. Furthermore, the actuation of the key with the letter "*m*" on it results in the bottom row of either the upper three rows or the lower three rows being positioned in the horizontal plane of the printing face 4. This is accomplished by rotation of the pulley 24. Of course, if row 3 is the row in which the shell 5 is normally disposed, there would be no vertical movement of the shell 5 when the key "*m*" is depressed. However, if "M" is desired, the operator depresses the shift key in addition to the key "*m*" and this results in the shell 5 being advanced axially to permit the bottom row (6) of the lower three rows (4–6) to be positioned in the same horizontal plane as the printing face 4.

Depression of the key with the letter "*m*" also causes column 1 to be moved into the same vertical plane as the printing face 4 by rotation of the pulley 28. Of course, if column 1 is the reference column, there is no rotation of the shell 5 by the pulley 28. It should be understood that the shell 5 returns to its reference position after the printing of each character as described in the aforesaid Palmer patent.

Figures 6, 7, 8, 9:
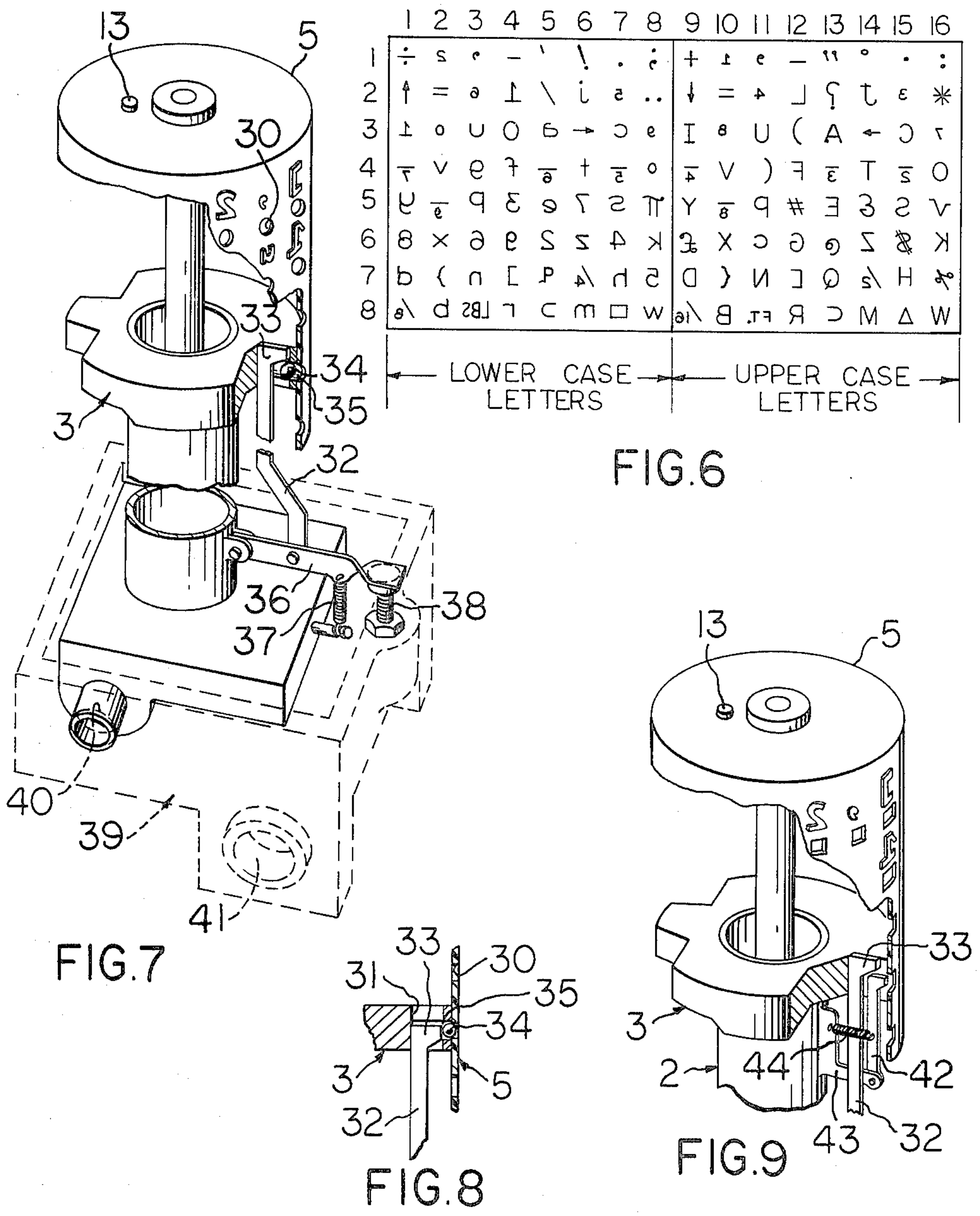
FIG. 6 is a development view of another group of characters utilized on the periphery of the printing or type head.
FIG. 7 is a perspective view, partly in section, of a modification of the single element printing head of FIG. 1.
FIG. 8 is a sectional view of a portion of the structure of FIG. 7 in its printing position.
FIG. 9 is a perspective view of another embodiment of the locking mechanism for use with the structure of FIG. 7.

If desired, the character arrangement of FIG. 6 may be utilized on the periphery of the shell 5. Of course, the shell 5 would require a greater length to accommodate the character arrangement of FIG. 6 in which there are eight horizontal rows and sixteen vertical columns for a total of 128 characters. Furthermore, the characters are arranged with the upper case letters disposed in all of the eight horizontal rows and in eight of the columns (1–8) while the lower case letters also are positioned in all of the eight horizontal rows but in the eight other vertical columns (9–16). Whenever it is desired to present one of the upper case letter characters at the printing face 4 of the printing anvil 3, it is necessary to rotate the shell 5 rather than advance it axially as is required with the character arrangement of FIG. 5. Thus, the shifting structure in the aforesaid Palmer patent would be connected in the same way as it is in the aforesaid Palmer patent since the upper case letters are selected by rotating the shell 5 180°.

In the arrangement of FIG. 6, the upper and lower case letters, which would appear on the same key to the operator, are placed in the same horizontal row and spaced eight columns apart. For example, "O" is found in column 16 of row 4 whereas "*o*" is found in column 8 of row 4. Thus, the selection of the key with the letter "*o*" by the operator causes axial movement of the shell 5 to position row 4 in the same horizontal plane as the printing face 4. The shell 5 is rotated about its axis to move solumn 8 in front of the printing face 4 whereby the letter "*o*" is positioned for engagement with the platen 6 for printing.

If the letter "O" is desired, it is necessary for the operator to depress both the key with the letter "O" and the shift key. The actuation of the shift key causes rotation of the shell 5 to allow columns 9–16 to be positioned in front of the printing face 4. The actuation of the key "*o*" results in row 4 being disposed in the same horizontal plane as the printing face 4. Since the shift key has been actuated, column 16 is presented to the printing face 4 rather than column 8 when the key with the letter "*o*" is depressed. Of course, if columns 8 and 16 were the reference columns for the lower case letters and upper case letters, respectively, there would be no rotation of the shell 5 when typing "*o*" and only rotation due to depressing the shift key when typing "O."

An inspection of the arrangement of the characters in FIG. 6 discloses that the characters with the larger face areas are disposed in the bottom row, which is row 8. For example, note that both "M" and "*m*" are in row 8. Thus, the same general arrangement is utilized in which the lowermost row on the periphery of the shell 5 has the characters of greatest face areas. In any column, the areas of the face characters generally decrease from the bottom row (8) to the top row (1). This permits the varying inertial forces, which are created by a change in position of the shell 5 with respect to the pivot axis of the base 1, to be utilized to provide a greater printing force for the characters with the largest type areas since these require a greater printing force. As previously mentioned, this axial shifting of the shell 5 creates an appreciable variance in the printing force.

In order to insure that the mass of the non-moving printing anvil 3 is applied behind the selected character when it is engaged with the platen 6 to print the selected character, there is a specific arrangement between the platen 6 and the printing face 4 of the printing anvil 3. The printing face 4 is disposed so that there is a straight line through its center which is perpendicular to the axis of the cylindrical platen 6. Furthermore, the pivot axis of the base 1 is positioned so that there is a straight line through the pivot axis of the base 1 which is tangent to the cylindrical platen 6 and perpendicular to the above defined line connecting the center of the printing face 4 and the axis of the platen 6 as clearly shown in FIG. 2. This insures that the full face of the character makes contact with the platen 6 and is backed up by the printing face 4. Without this arrangement, the entire character being typed would not make complete contact with the platen 6.

The curvatures of the platen 6 and the shell 5 insure that only one character is printed at a time. Thus, the curvature of the platen 6 allows only one character in any specific column to engage with the platen 6 at one time. Similarly, the curvature of the shell 5 permits only one character in any horizontal row to be presented for engagement with the platen 6.

In order to retain the selected character in position in front of the printing face 4 of the printing anvil 3 during printing, a detent locking mechanism may be employed. One embodiment of the detent locking mechanism or means is disclosed in FIGS. 7 and 8 wherein a plurality of apertures 30 is arranged in parallel rows and vertical columns. Each of the characters on the periphery of the shell 5 has one of the apertures 30 disposed in vertical alignment beneath it although the apertures 30 could be arranged above the characters, if desired.

The printing anvil has its rear portion slightly enlarged to provide support for means to cooperate with the apertures 30. The anvil 3 has a slot 31 extending vertically through its rear portion with an actuating member 32 disposed therein. The upper extremity of the actuating member 32 is enlarged to form a cam portion 33 for cooperation with a ball 34, which is disposed within a passage 35 in the printing anvil 3. The passage 35 provides communication between the slot 31 and the exterior of the printing anvil 3.

The lower end of the actuating member 32 is pivotally connected to an arm 36, which is pivotally attached to the support 2. Resilient means such as spring 37 is attached to the pivoted arm 36 and to the base 1 to urge the actuating member 32 downwardly. The downward movement of the arm 36 and the actuating member 32 is limited by engagement of the arm 36 with a stud 38, which is secured to a portion 39 of the typewriter.

It should be understood that the base 1 is mounted by hollow trunnions 7*a* and 8*a*, which extend from the ears 7 and 8, respectively, for positioning within bearing apertures 40 (one shown) in the portion 39. Thus, the base 1 pivots through its hollow trunnions 7*a* and 8*a* with respect to the portion 39. The portion 39 slides along a shaft (not shown) extending through openings 41 (one shown) in the portion 39 as described in the aforesaid Palmer patent to move the type head shell 5 with respect to the platen 6 so that the platen 6 does not move. Of course, the platen 6 could be movable in the well-known manner, if desired, and the portion 39 would then be fixed.

When the base 1 is pivoted to move the selected character on the shell 5 into engagement with the platen 6, there is relative movement between the printing anvil 3, the actuating member 32, and the arm 36 resulting in the actuating member 32 being urged downwardly within the slot 31 with the aid of the spring 37. The downward movement of the actuating member 32 causes the cam portion 33 to engage the ball 34 and move the ball 34 into one of the apertures 30 (see FIG. 8) on the side of the shell 5 away from the printing face 4. With the ball 34 disposed within the aperture 30 in the shell 5, the shell 5 is locked in position so that the selected character is disposed in front of the printing face 4 of the printing anvil 3 to insure that the selected character remains in its exact position during printing. Furthermore, if the selected character should not be exactly centered when the printing operation begins by pivoting of the base 1, the positioning of the ball 34 within the aperture 30 moves the selected character to the exact printing position. The downward movement of the actuating member 32 is limited by the stop stud 38 so that the actuating member 32 does not move beyond the position of FIG. 8.

After the selected character has been printed, the base 1 is pivoted to return it to the position in which another character is selected by the operator of the typewriter. At this time, the actuating member 32 moves upwardly in the slot 31 in the printing anvil 3. However, the ball 34 remains in the aperture 30 until the operator of the typewriter selects another character. The movement of the shell 5 due to the selection of a new character results in a camming action between the ball 34 and the aperture 30 to remove the ball 34 therefrom to allow free movement of the shell 5.

Another type of detent locking means is shown in FIG. 9 wherein the ball 34 is replaced by a pointed pawl 42, which is pivotally mounted on the bracket 43 on the support 2. The operation of the detent locking means of FIG. 9 is substantially the same as the structure of FIGS. 7 and 8 except that the downward movement of the actuating member 32 results in the cam portion 33 urging the pointed pawl 42 rather than the ball 34 of FIGS. 7 and 8 into one of the apertures 30. Furthermore, a spring 44 is attached to the pawl 42 and to the support 2 to insure removal of the pawl 42 from the aperture 30 when the cam portion 33 ceases to contact the pawl 42.

An advantage of this invention is that an improved quality of print is obtained because a greater printing force is utilized for type characters with greater face area. Another advantage of this invention is that the mass of the printing anvil is concentrated behind the character being printed. A further advantage of this invention is that the selected character is always in its exact printing position during printing.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A single element printing head comprising:
a substantially disc shaped pivotally mounted printing anvil having a printing face at a reference position;
said printing anvil having its periphery reduced at a plurality of areas to form a projection between said reduced areas, said projection forming said printing face;
a cylindrical shell surrounding said printing anvil;
said shell having a plurality of type characters arranged on its periphery in parallel rows and parallel columns;
said printing face having a depth of at least substantially one of the rows of said characters and less than two of the rows of said characters;
and means to position said shell with respect to said printing anvil to dispose one of said characters on said shell at said reference position.

2. A single element printing head comprising:
a substantially disc shaped pivotally mounted printing anvil having a periphery, said periphery having a plurality of reduced areas to form a printing face between said reduced areas at a reference position;
a cylindrical shell surrounding said printing anvil;
said shell having a plurality of type characters arranged on its periphery in parallel rows and parallel columns;
said printing anvil having a depth of at least substantially one of the rows of said characters and less than two of the rows of said characters;
said printing face having a shell contact area substantially the same as the outline of the area of the largest of said characters on said shell;
and means to position said shell with respect to said printing anvil to dispose one of said characters on said shell at said reference position.

3. A single element printing head comprising:
a substantially disc shaped printing anvil having a printing face at a reference position;
said printing anvil having its periphery reduced at a plurality of areas to form a projection between said reduced areas, said projection forming said printing face:
a cylindrical shell surrounding said printing anvil;
said shell having a plurality of type characters arranged on its periphery in parallel rows and parallel columns;
said printing face having a depth of at least substantially one of the rows of said characters and less than two of the rows of said characters;
said shell having a small mass in comparison with the mass of said printing anvil;
and means to position said shell with respect to said printing anvil to dispose one of said characters on said shell at said reference position.

4. A single element printing head comprising:
a substantially disc shaped printing anvil having a periphery, said periphery having a plurality of reduced areas to form a printing face between said reduced areas at a reference position;
a cylindrical shell surrounding said printing anvil;
said shell having a plurality of type characters arranged on its periphery in parallel rows and parallel columns;
said printing anvil having a depth of at least substantially one of the rows of said characters and less than two of the rows of said characters;
said printing face having a shell contact area substantially the same as the outline of the area of the largest of said characters on said shell;
said shell having a small mass in comparison with the mass of said printing anvil;
and means to position said shell with respect to said printing anvil to dispose one of said characters on said shell at said reference position.

5. A single element printing mechanism comprising:
an upstanding support adapted to be pivoted about an axis and having a printing anvil at its uppermost end;

said printing anvil having a periphery, said periphery having a plurality of reduced areas to form a printing face between said reduced areas at a reference position;
a cylindrical shell surrounding said printing anvil;
said shell having a plurality of type characters arranged on its periphery in parallel rows and parallel columns;
said printing face having a depth substantially the same as one of the rows of said characters;
means to position said shell with respect to said printing anvil to dispose any selected character on said shell at said reference position before said support is pivoted;
and a cylindrical platen arranged for engagement by said reference position character of said shell at a point lying in a straight line extending through the center of the printing face and perpendicular to the axis of said platen.

6. A single element printing mechanism comprising:
an upstanding support adapted to be pivoted about an axis and having a printing anvil at its uppermost end;
said printing anvil having a periphery, said periphery having a plurality of reduced areas to form a printing face between said reduced areas at a reference position;
a cylindrical shell surrounding said printing anvil;
said shell having a plurality of type characters arranged on its periphery in parallel rows and parallel columns;
means to position said shell with respect to said printing anvil to dispose any selected character on said shell at said reference position before said support is pivoted;
a cylindrical platen arranged for engagement by said reference position character of said shell at a point lying in a straight line extending through the center of the printing face and perpendicular to the axis of said platen;
and said pivot axis of said support lying in a straight line tangent to said platen and perpendicular to said straight line that extends through the center of the printing face and is perpendicular to the axis of said platen.

7. A single element printing head comprising:
a printing anvil adapted to be pivoted;
said printing anvil having a periphery, said periphery having a plurality of reduced areas to form a printing face between said reduced areas at a reference position;
a shell surrounding said printing anvil;
said shell having a plurality of type characters arranged on its periphery in parallel rows and parallel columns;
means to position said shell with respect to said printing anvil to dispose any selected character on said shell at a reference position before said printing anvil is pivoted;
and detent means on said printing anvil cooperating with said shell to lock said selected character in said reference position when said printing anvil is pivoted to print said selected character.

8. A single element printing head comprising:
a printing anvil adapted to be pivoted;
said printing anvil having a periphery, said periphery having a plurality of reduced areas to form a printing face between said reduced areas at a reference position;
a shell surrounding said printing anvil;
said shell having a plurality of type characters arranged on its periphery in parallel rows and parallel columns;
means to position said shell with respect to said printing anvil to dispose any selected character on said shell at a reference position;
said shell having apertures arranged in parallel rows with each of said characters having one of said apertures vertically spaced from and in alignment with one of said characters;
and detent means in said printing anvil, said detent means adapted to be disposed on one of said apertures to lock said selected character at said reference position when said printing anvil is pivoted to print said selected character.

9. A single element printing head comprising:
a base mounted for pivotal movement;
a printing anvil fixed to said base and disposed in spaced relation thereto;
said printing anvil having a printing face at a reference position;
a cylindrical shell surrounding said printing anvil;
said shell having a plurality of type characters arranged on its periphery in parallel rows and parallel columns;
means to position said shell with respect to said printing anvil to dispose one of said characters on said shell at said reference position;
said printing anvil having a slot disposed therein;
actuating means adapted to be actuated when said base pivots and having a portion disposed in said slot in said printing anvil;
said shell having apertures arranged in parallel rows with each of said characters having one of said apertures aligned therewith;
said printing anvil having a passage communicating with said slot therein and the exterior thereof;
and means positioned in said passage and adapted to be moved into one of said apertures by said portion of said actuating means in said slots in said printing anvil when said base pivots to lock said one character at said reference position for printing said one character.

10. A single element printing head comprising:
a base mounted for pivotal movement;
a printing anvil fixed to said base and disposed in spaced relation thereto;
said printing anvil having a printing face at a reference position;
a cylindrical shell surrounding said printing anvil;
said shell having a plurality of type characters arranged on its periphery in parallel rows and parallel columns;
means to position said shell with respect to said printing anvil to dispose one of said characters on said shell at said reference position;
said printing anvil having a slot disposed therein;
actuating means adapted to be actuated when said base pivots and having a portion disposed in said slot in said printing anvil;
said shell having apertures arranged in parallel rows with each of said characters having one of said apertures aligned therewith;
said printing anvil having a passage communicating with said slot therein and the exterior thereof;
at least one ball disposed in said passage;
and said portion of said actuating means in said slot in said printing anvil moving said ball into one of said apertures in said shell to lock said character at said reference position when said base pivots to print said one character.

11. A single element printing head comprising:
a base mounted for pivotal movement;
a printing anvil fixed to said base and disposed in spaced relation thereto;
said printing anvil having a printing face at a reference position;
a cylindrical shell surrounding said printing anvil;
said shell having a plurality of type characters arranged on its periphery in parallel rows and parallel columns;
means to position said shell with respect to said printing anvil to dispose one of said characters on said shell at said reference position;

said printing anvil having a slot disposed therein;
actuating means adapted to be actuated when said base pivots and having a portion disposed in said slot in said printing anvil;
said shell having apertures arranged in parallel rows with each of said characters having one of said apertures aligned therewith;
said printing anvil having a passage communicating with said slot therein and the exterior thereof;
a ball disposed in said passage;
and said portion of said actuating means in said slot in said printing anvil including a cam member to move said ball into one of said apertures in said shell to lock said one character at said reference position when said base pivots to print said one character.

12. A single element printing head comprising:
a base mounted for pivotal movement;
an upstanding support attached to said base and having a printing anvil at its uppermost end;
said printing anvil having a printing face at a reference position;
a cylindrical shell surrounding said printing anvil;
said shell having a plurality of type characters arranged on its periphery in parallel rows and parallel columns;
means to position said shell with respect to said printing anvil to dispose one of said characters on said shell at said reference position;
said printing anvil having a slot disposed therein;
actuating means adapted to be actuated when said base pivots and having a portion disposed in said slot in said printing anvil;
said shell having apertures arranged in parallel rows with each of said characters having one of said apertures aligned therewith;
said printing anvil having a passage communicating with said slot therein and the exterior thereof;
a pawl disposed in said passage;
said pawl being pivotally mounted on said support;
and said portion of said actuating means in said slot in said printing anvil moving said pawl into one of said apertures to lock said one character at said reference position when said base pivots to print said one character.

13. A single element printing head comprising:
a substantially disc shaped printing anvil adapted to be pivoted;
said printing anvil having a periphery, said periphery having a plurality of reduced areas to form a printing face between said reduced areas at a reference position;
a shell surrounding said printing anvil;
said shell having a plurality of type characters arranged on its periphery in parallel rows and parallel columns;
said printing face having a depth of at least substantially one of the rows of said characters and less than two of the rows of said characters;
means to position said shell with respect to said printing anvil to dispose any selected character on said shell at a reference position;
and detent means on said printing anvil cooperating with said shell to lock said selected character in said reference position after pivoting of said printing anvil begins to print said selected character.

14. A single element printing head comprising:
a printing anvil adapted to be pivoted;
said printing anvil having a periphery, said periphery having a plurality of reduced areas to form a printing face between said reduced areas at a reference position;
a shell surrounding said printing anvil;
said shell having a plurality of type characters arranged on its periphery in parallel rows and parallel columns;
said printing face having a depth of at least substantially one of the rows of said characters and less than two of the rows of said characters;
means to position said shell with respect to said printing anvil to dispose any selected character on said shell at a reference position;
said shell having apertures arranged in parallel rows with each of said characters having one of said apertures vertically spaced from and in alignment with one of said characters, each of said apertures extending through said shell;
and detent means in said printing anvil, said detent means adapted to be disposed in one of said apertures to lock said selected character at said reference position after pivoting of said printing anvil begins to print said selected character.

15. A single element printing head comprising:
a printing anvil mounted for pivotal movement;
said printing anvil having a periphery, said periphery having a plurality of reduced areas to form a printing face between said reduced areas at a reference position;
a shell surrounding said printing anvil;
said shell having a plurality of type characters arranged on its periphery in parallel rows and parallel columns;
means to position said shell with respect to said printing anvil to dispose any selected character on said shell at a reference position;
said printing anvil having detent means mounted therein;
and actuating means mounted for cooperation with said detent means when said printing anvil is pivoted, said actuating means moving said detent means into locking engagement with said shell after pivoting of said printing anvil begins to lock said selected character at said reference position for printing said selected character.

16. A single element printing head comprising:
a printing anvil mounted for pivotal movement;
said printing anvil having a periphery, said periphery having a plurality of reduced areas to form a printing face between said reduced areas at a reference position;
a shell surrounding said printing anvil;
said shell having a plurality of type characters arranged on its periphery in parallel rows and parallel columns;
means to position said shell with respect to said printing anvil to dispose any selected character on said shell at a reference position;
said shell having apertures arranged in parallel rows with each of said characters having one of said apertures vertically spaced therefrom and aligned therewith;
said printing anvil having detent means mounted therein;
and actuating means mounted for cooperation with said detent means when said printing anvil is pivoted, said actuating means moving said detent means into locking engagement with one of said apertures of said shell after pivoting of said printing anvil begins to lock said selected character at said reference position for printing said selected character.

17. A single element printing head comprising:
a printing anvil mounted for pivotal movement;
said printing anvil having a periphery, said periphery having a plurality of reduced areas to form a printing face between said reduced areas at a reference position;
a cylindrical shell surrounding said printing anvil;
said shell having a plurality of type characters arranged on its periphery in parallel rows and parallel columns;
means to position said shell with respect to said printing anvil to dispose any selected character on said shell at said reference position;
said printing anvil having a slot disposed therein;
actuating means adapted to be actuated when said printing anvil pivots and having a portion disposed in said slot in said printing anvil;

said shell having apertures arranged in parallel rows with each of said characters having one of said apertures aligned therewith;

said printing anvil having a passage communicating with said slot therein and the exterior thereof;

and means positioned in said passage and adapted to be moved into one of said apertures by said portion of said actuating means in said slot in said printing anvil when said printing anvil pivots to lock said selected character at said reference position for printing said selected character.

References Cited by the Examiner

UNITED STATES PATENTS

| | | | |
|---|---|---|---|
| 410,629 | 9/1889 | Arnold | 197—49 |
| 447,720 | 3/1891 | Wilder | 197—50 |
| 644,187 | 2/1900 | Sears | 197—49 |
| 667,433 | 2/1901 | Ferguson | 197—55 |
| 693,208 | 2/1902 | Armstrong | 197—55 |
| 1,935,715 | 11/1933 | Hunt et al. | 295—252 |
| 2,044,550 | 6/1936 | Teissedre | 197—55 |
| 2,067,821 | 1/1937 | Bell | 197—49 X |
| 2,139,193 | 12/1938 | Lamothe et al. | 192—252 |
| 2,180,360 | 11/1939 | Krum et al. | 197—53 |
| 2,535,947 | 12/1950 | Newell | 292—23 X |
| 2,895,584 | 7/1959 | Hickerson et al. | 197—52 |
| 2,901,804 | 9/1959 | Williams | 85—1 X |
| 2,919,002 | 12/1959 | Palmer | 197—16 |
| 3,175,671 | 3/1965 | Lapointe et al. | 197—50 |

ROBERT E. PULFREY, *Primary Examiner.*

EDGAR S. BURR, *Assistant Examiner.*